Patented Nov. 15, 1932

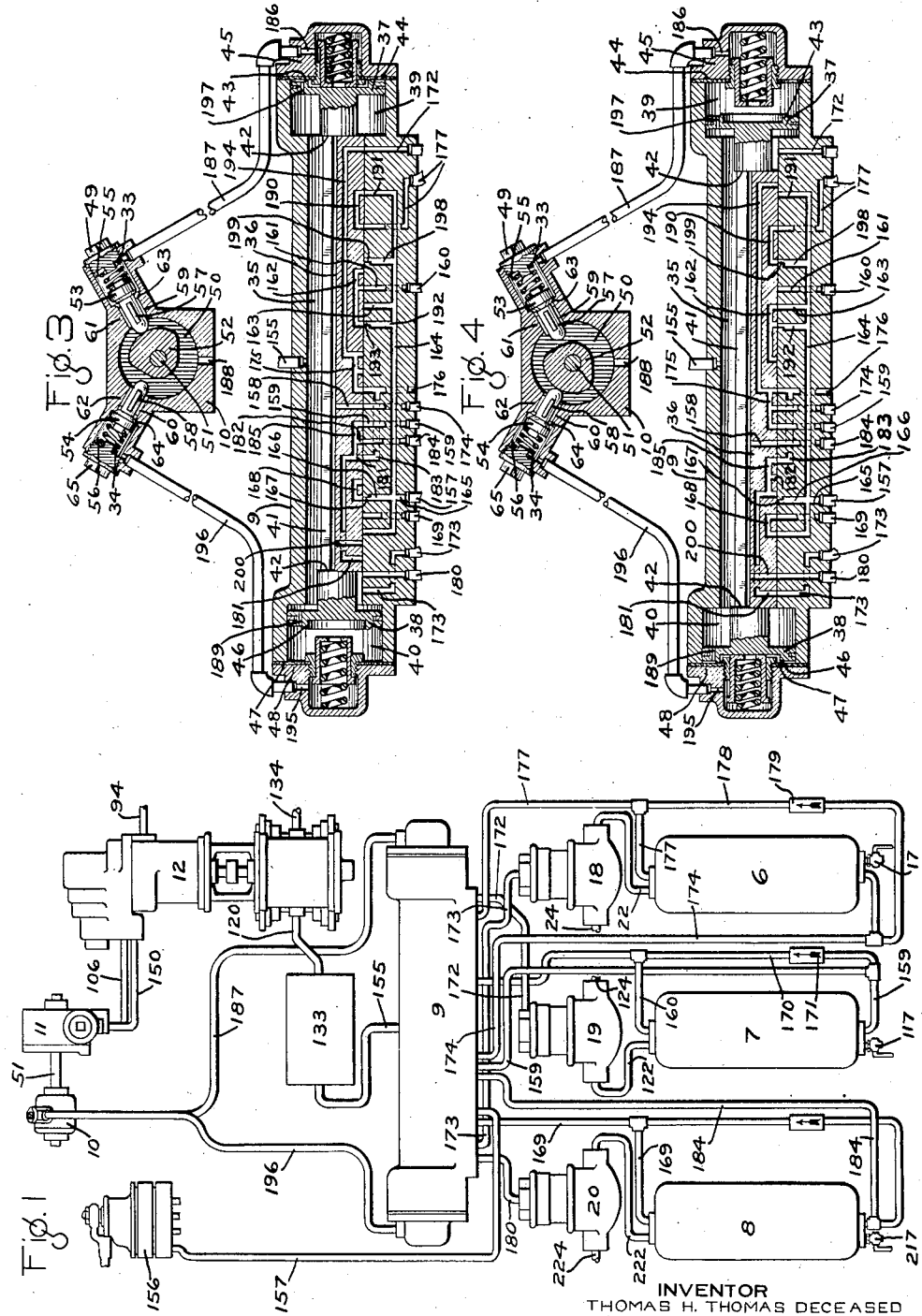

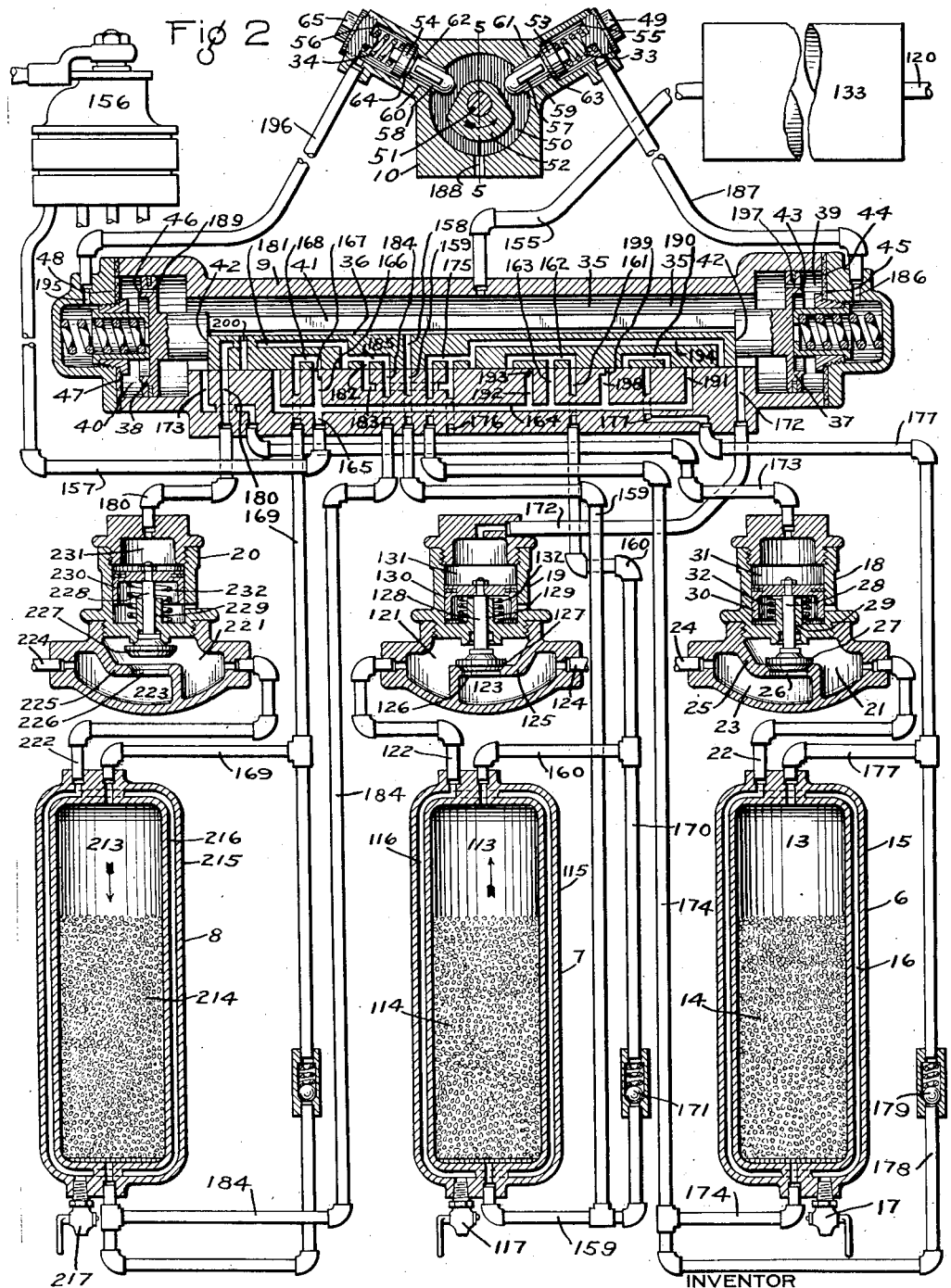

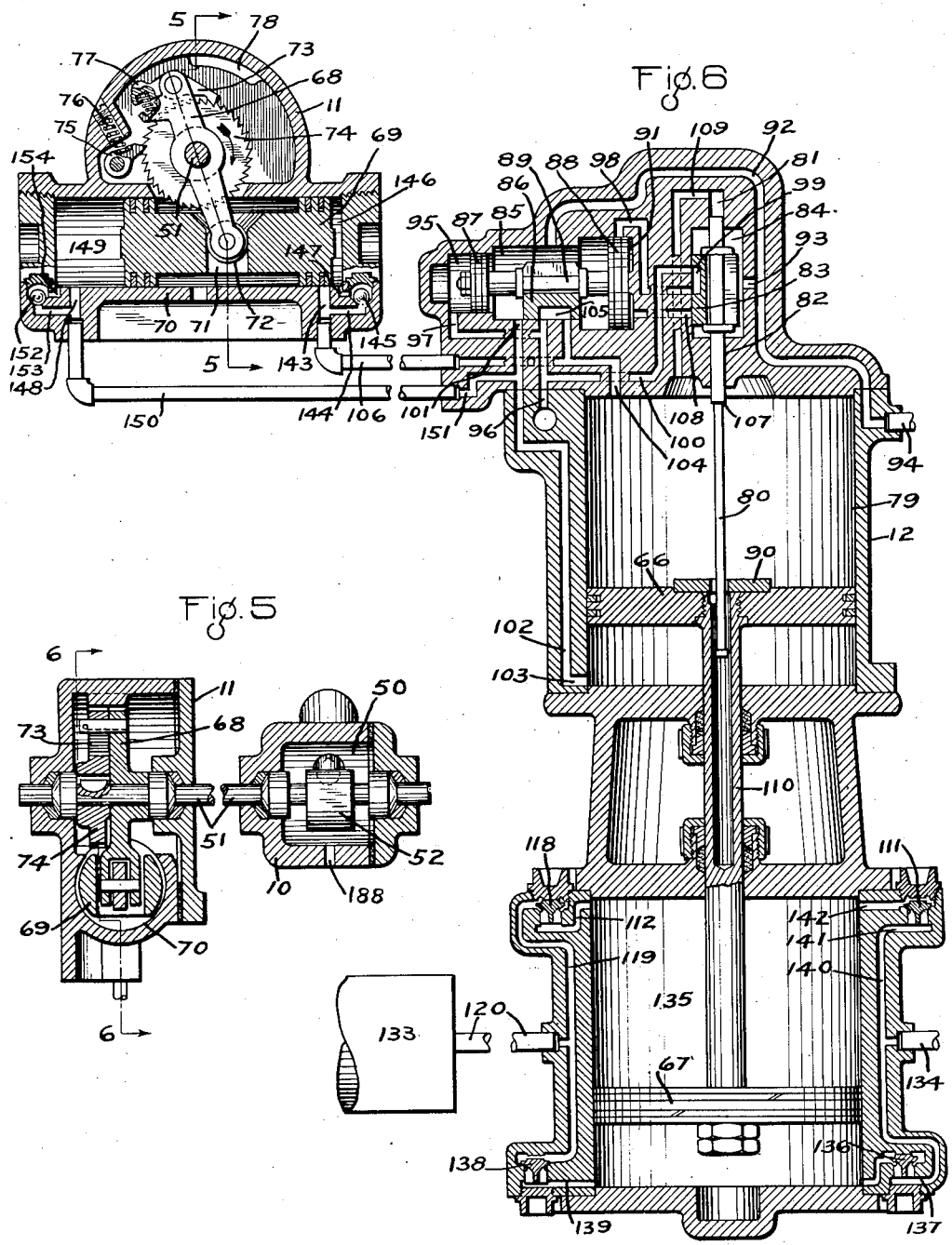

1,887,606

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

AIR PURIFIER

Application filed March 8, 1930. Serial No. 434,438.

This invention relates to purifiers and more particularly to an apparatus for purifying air employed in fluid pressure brake systems.

An object of the invention is to provide an air purifying apparatus which is adapted to remove oil and water vapors contained in the fluid which is withdrawn from the main reservoir of an air brake system.

Another object of the invention is to provide an air purifying apparatus of the character specified, in which the fluid is successively conducted through a plurality of filters or purifying devices.

Another object of the invention is to provide an air purifying apparatus having a plurality of air purifying devices through which the fluid is successively passed, and in which the means for directing the flow of fluid successively through the devices is controlled by the means provided for compressing the air.

Another object of the invention is to provide an air purifying apparatus containing a plurality of air purifying devices through which the fluid is successively passed for predetermined periods, and in which means are included for removing the impurities from the cleansing medium in the air purifying devices during the periods the devices are not functioning as filters.

Another object of the invention is to provide an air purifying apparatus employing a plurality of filtering devices through which the air is periodically passed, and in which means are provided for heating and then cooling the filtering devices during the periods such devices are not functioning as filters.

Another object of the invention is to provide an improved air purifying apparatus of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figure 1 is a diagrammatic view of an air purifying apparatus embodying the invention; Fig. 2 is a diagrammatic view, mostly in section, of a portion of the apparatus shown in Fig. 1, the control mechanism for the filters being shown in intermediate position in which the air to be filtered is passed through the middle filter; Fig. 3 is a section of the upper portion of the structure shown in Fig. 2, showing the control mechanism for the filter in the position in which the air to be filtered is caused to pass through the right hand filter; Fig. 4 is a view similar to Fig. 3, showing the control mechanism for the filters in the position in which the air to be filtered is caused to pass through the left hand filter; Fig. 5 is a section taken on the lines 5—5 of Figs. 2 and 6 showing the pilot valve and its actuator in transverse section; and Fig. 6 is a section taken on the line 6—6 of Fig. 5 showing the pilot valve actuator and air compressor.

With the usual fluid pressure brake system employed on railway trains and other vehicles, the apparatus is equipped with an air compressor and one or more main reservoirs into which the compressor compresses air.

The compressed air carries in suspension more or less oil, which comes from the compressor, and water vapor which is present in the air taken from the atmosphere by the compressor.

It has been found that oil and water carried by the air. tends to collect in the several parts of the brake system, and in some cases, the deposits so formed interfere with the desired operation of the brakes, and in view of this it is very desirable that the oil and water be removed from the air before it is supplied to the brake apparatus.

By the present invention, means are provided for purifying the air when it is withdrawn from a main reservoir of a fluid pressure brake system, the air being passed successively through a plurality of filtering devices, each containing a filtering medium capable of removing all of the oil and water vapors and other foreign matter from the compressed air. Preferably three filtering devices are employed. These devices are adapted to be used periodically, and means are provided for successively utilizing each of the filters. Also incorporated with the apparatus are means for periodically cleaning the filters. Immediately after the filters have been in operation, heat, preferably in the form of steam, is applied to the exterior of the casings containing the filtering medium, and the steam heats the interior of the casings. Simultaneously, compressed air is directed through the heated filters in a direction opposite to that in which the air flows when being filtered. By reversing the direction of flow of the air through the filters and by heating the same, the impurities collected in the filtering devices during the filtering operations become quickly dislodged and are carried to the atmosphere. After the filter cleaning period, the devices remain dormant for a third period, so that the same can cool before being again placed into operation.

Referring to the drawings, the apparatus may comprise a plurality of filtering devices 6, 7 and 8. These filters are connected in a manner to be described to a control mechanism 9 adapted to periodically change the flow of the compressed air so that the air will periodically flow successively through the filters.

The control mechanism 9 may be actuated by a pilot valve device 10 which is positively operated through the medium of a motor device 11 that is connected to an air compressor 12 and actuated thereby. The air compressor 12 may be of the steam type usually mounted on locomotives.

The filtering devices 6, 7 and 8 are each similarly formed.

The filtering device 6 comprises a chamber 13 containing a suitable filtering material 14, such for instance as silicon dioxide ($SIO_2$). The chamber 13 is enclosed by a jacket 15 which is spaced from the wall of the chamber so as to provide a steam chamber 16 for a purpose to be hereinafter more fully described. A drain cock 17 is provided for enabling the steam chamber 16 to be drained.

The filtering device 7 comprises a chamber 113 containing filtering material 114 similar to that in the chamber 13 of the filtering device 6. The chamber 113 is enclosed by a jacket 115 which is spaced from the wall of the chamber so as to provide a steam chamber 116. A drain cock 117 is provided for enabling the steam chamber 116 to be drained.

The filtering device 8 comprises a chamber 213 containing filtering material 214 similar to that in the chambers of the filtering devices 6 and 7. The chamber 213 is enclosed by a jacket 215 which is spaced from the wall of the chamber so as to provide a steam chamber 216. A drain cock 217 is provided for enabling the steam chamber 216 to be drained.

Associated with the filtering device 6, and designed to permit the circulation of steam through the chamber 16 thereof, is a control valve device 18. Similar control valve devices 19 and 20 are used respectively in conjunction with the filtering devices 7 and 8.

The control valve device 18 comprises a casing having a chamber 21 connected to the steam chamber 16 by a pipe 22 and a chamber 23 which is supplied with steam from a suitable source of supply through a pipe 24. The chambers 21 and 23 are separated by a wall 25 containing an opening 26 having a seat for a valve 27. The valve 27 has a stem 28 which is slidably mounted in a bore 29 formed in the casing. The stem 28 carries a piston 30 which is mounted in a chamber 31. On one side the piston 30 is subject to the pressure of an expansible coil spring 32, while on its opposite side the piston is subject to the pressure of fluid in chamber 31.

The control valve device 19 comprises a casing having a chamber 121 connected to the steam chamber 116 by a pipe 122 and a chamber 123 which is supplied with steam from a suitable source of supply through a pipe 124. The chambers 121 and 123 are separated by a wall 125 containing an opening 126 having a seat for a valve 127. The valve 127 has a stem 128 which is slidably mounted in a bore 129 formed in the casing. The stem 128 carries a piston 130 which is mounted in a chamber 131. On one side the piston 130 is subject to the pressure of an expansible coil spring 132, while on its opposite side the piston is subject to the pressure of fluid in chamber 131.

The control valve device 20 comprises a casing having a chamber 221 connected to the steam chamber 216 by a pipe 222 and a chamber 223 which is supplied with steam from a suitable source of supply through a pipe 224. The chambers 221 and 223 are separated by a wall 225 containing an opening 226 having a seat for a valve 227. The valve 227 has a stem 228 which is slidably mounted in a bore 229 formed in the casing. The stem 228 carries a piston 230 which is mounted in a chamber 231. On one side the piston 230 is subject to the pressure of an expansible coil spring 232, while on its opposite side the piston is subject to the pressure of fluid in chamber 231.

The control mechanism 9 has a chamber 35 containing a slide valve 36 which is actuated by two pistons 37 and 38, mounted respectively in chambers 39 and 40 formed in the casing of the control mechanism 9. The pistons 37 and 38 are connected by a rod 41 which has a shoulder or flange 42 engaging the slide valve 36 in such a manner that relative movement of the piston causes a corresponding movement of the slide valve.

The outer face of the piston 37 is provided with a seat rib 43 which is adapted to engage a gasket 44 mounted on the end wall 45 of the control mechanism 9.

Likewise, the outer face of the piston 38 is provided with a seat rib 46 which is adapted to engage a gasket 47 mounted on the end wall 48 of the control mechanism 9.

The pilot valve device 10 is formed with a chamber 50 through which is passed a rotatable shaft 51 carrying a cam 52. The cam 52 is adapted to actuate a pair of valves 53 and 54 mounted in the casing of the pilot valve device 10.

The valve 53 has a head which is disposed in a chamber 55, while the valve 54 has a head which is disposed in a chamber 56. As shown in Fig. 1, the chambers 55 and 56 are located on opposite sides of the pilot valve device 10.

The valve 53 is provided with a fluted stem 57 which is slidably mounted in an opening 59 formed in a wall 61 separating the chambers 55 and 50. The wall 61 is formed with a seat 63 for the valve 53.

The valve 54 is provided with a fluted stem 58 which is slidably mounted in an opening 60 formed in a wall 62 separating the chambers 56 and 50. The wall 62 is formed with a seat 64 for the valve 54.

For the purpose of maintaining the valves 53 and 54 seated when the device is in the intermediate position shown in Fig. 2, a coil spring 33 is mounted in the chamber 55 and bears against the head of the valve 53, and a coil spring 34 is mounted in the chamber 56 and bears against the head of valve 54. The tension of the spring 33 may be adjusted by means of a nut 49 threaded into the end wall of the chamber 55, while the tension of the spring 34 may be adjusted by means of a nut 65 threaded into the end wall of the chamber 56.

The nuts 49 and 65 also serve as means for plugging the ends of the casing of the pilot valve device 10, and should it be necessary to reseat or replace the valves 53 and 54, the nuts can be easily removed so as to expose the interior of the valve chambers 55 and 56, as will be readily understood.

The shaft 51 of the pilot valve device 10 is also mounted in the casing of the motor device 11 heretofore referred to.

Referring to Figs. 5 and 6, an arm 68 is loosely mounted on the portion of the shaft 51 within the casing of the motor device 11. This arm is oscillated by a double end piston 69 mounted in a cylinder 70 formed as a part of the casing. The piston 69 has a slot 71 formed therein to receive a roller 72 carried by one end of the arm 68.

The end of the arm 68 opposite to the roller 72 carries a spring-pressed pawl 73 which engages the teeth of a ratchet wheel 74 fixed to the shaft 51. The ratchet wheel 74 is adapted to be actuated in a manner to be described to revolve the shaft 51, and in order to prevent a back motion of the ratchet wheel, a second pawl 75 is provided. The pawl 75 is held in engagement with the ratchet wheel by means of a spring 76.

Mounted within the casing of the motor device 11 and disposed within the path of a projection 77 formed on the pawl 73, is a cam face 78 adapted to disengage the nose end of the pawl 73 from its engagement with the ratchet wheel 74 when the arm reaches the forward end of its stroke.

The air compressor 12 has a main steam piston 66 which is mounted in a cylinder 79. The piston 66 has a rod 80, one end of which is guided by a pair of spaced bores 81 and 82 formed in the head of the compressor.

The piston rod 80 carries a reversing valve 83 which is disposed within a chamber 84 formed in the head of the compressor between the guide openings 81 and 82.

A main valve 86 for the compressor is mounted in a chamber 85. This valve is operated by two pistons 87 and 88, of unequal diameters and connected by a stem 89.

The movement of the pistons 87 and 88 and the main valve 86 is controlled by the reversing valve 83 which in turn is operated by the main steam piston 66, by means of rod 80 and a reversing plate 90.

The purpose of the reversing valve 83 is to alternately admit steam or to discharge it from a chamber 91, at the right of piston 88, thus alternately balancing and unbalancing this piston. The reversing valve 83 is operated by the rod 80. This rod is alternately moved up and down by the plate 90 in the manner understood by those skilled in the art.

In operation, chambers 84 and 85 of the air compressor 12 are always in free communication with each other and with the steam inlet through ports 92 and 93, as shown in Fig. 6. Live steam, which is admitted to the port 92 through supply pipe 94, is therefore always present in chambers 84 and 85. Chamber 95, at the left of small piston 87, is always open to the exhaust passage 96 through port 97. Exhaust steam, substantially at atmospheric pressure, is therefore always present in chamber 95.

A balancing port 109 leads from the bore 81 and enters the upper end of the cylinder 79. The object of this port is to assure the same pressure above as below the reversing rod 80, whether there is live or exhaust steam in the upper end of the cylinder, thus balancing it so far as steam pressure is concerned.

When the reversing slide valve 83 is in its lower position, as shown in Fig. 6, chamber 91 is connected through port 98, reversing valve exhaust cavity 99 and port 100 with main exhaust passage 96, and there is, therefore, only atmospheric pressure at the right of piston 88.

Therefore, as chamber 95, at the left of piston 87, and chamber 91, at the right of piston 88, are then both connected to the exhaust, as already explained, the pressure of the steam in chamber 85 has driven the larger piston 88, to the right, and it has pulled the smaller piston 87, and the main valve 86, with it to the position shown in Fig. 6.

The main valve 86, is then admitting steam below piston 66, through ports 101, 102, and 103. Piston 66 is thereby forced upward, and the steam above piston 66 passes through port 104, exhaust cavity 105 of the main valve 86 to passage 96 which discharges the steam into the atmosphere. However, inasmuch as port 104 is also connected to a pipe 106 leading to the motor device 11, not all of the steam passing through the port 104 will be exhausted to the atmosphere.

When piston 66 reaches the upper end of its stroke, reversing plate 90 strikes a shoulder 107 on rod 80, forcing the rod and the reversing slide valve 83 upward sufficiently to open port 108. The pressures upon the two sides of the piston 88 are thus equalized or balanced. Considering piston 87, the conditions are different. Chamber 95, as heretofore stated, is always open to the exhaust. As piston 88 is now balanced, the steam pressure in chamber 85 forces piston 87 to the left, drawing with it piston 88 and the main slide valve 86.

With the main valve 86 thus positioned, steam is admitted from chamber 85, through port 104, above piston 66 forcing said piston down. At the same time the steam below piston 66 is exhausted to the atmosphere through ports 103, 102, 101, exhaust cavity 105, and port 96.

When the piston 66 reaches the lower end of its stroke, the reversing valve 83 will be drawn down to the position shown in Fig. 6, and one complete cycle of the steam end of the compressor has been completed.

The movement of steam piston 66 is imparted to air piston 67 by means of the piston rod 110. As the air piston 67 is raised, the air above it is compressed, and air from the atmosphere is drawn in beneath it, through the air inlet pipe 134. The reverse is true in the downward stroke.

On the upward stroke of piston 67, the air being compressed above it is prevented from discharging back into the atmosphere by the upper inlet valve 111. As soon as the pressure in port 112, below the upper discharge valve 118 becomes greater than the main reservoir pressure above it, the discharge valve 118 is lifted from its seat. The air then flows past this valve and through passage 119 and pipe 120, to the main reservoir 133.

The upward movement of the air piston 67 produces a partial suction or vacuum in the portion of the cylinder 135 below the piston. The air pressure below piston 67 and on top of the inlet valve 136 becomes, therefore, less than that of the atmosphere in port 137 underneath this valve. Atmospheric pressure therefore raises valve 136 from its seat, and atmospheric air is drawn into the lower portion of the cylinder 135, filling same. Air cannot enter this part of the cylinder 135 by flowing back from the reservoir through passage 119 and lower discharge valve 138, since the valve 138 is held to its seat by the main reservoir pressure above it. The lower inlet valve 136 seats by its own weight as soon as the up stroke of the air piston 67 is completed.

On the downward stroke of the pistons 66 and 67, the effect just described is reversed, the air below piston 67 being compressed and forced out through port 139, past lower discharge valve 138 and through passage 119 and the pipe 120 into the main reservoir 133. At the same time air is being drawn in from the atmosphere through pipe 134, passage 140, port 141, upper inlet valve 111, and port 142 into the upper end of the cylinder 135 above the air piston 67.

The pipe 106 leading from the port 104 of the air compressor 12 is connected to a port 143 provided in the motor device 11. The port 143 is connected to a passage 144 containing a ball check valve 145 which normally closes the passage 144 from a chamber 146 at the right of piston 69.

As shown in Fig. 6, when piston 66 of the air compressor is down, piston 69 of the motor device 11 will be disposed at the right end of the cylinder 70, the head of the piston 69 covering port 143. Therefore, steam forced through port 104 during the upward movement of piston 66, will flow through pipe 106, port 143 and passage 144, unseat the ball check 145, and enter chamber 146 through restricted passage 147, forcing piston 69 to the left. When port 143 is uncovered, due to this movement of the piston 69, unrestricted pressure will be admitted into chamber 145 to drive the piston 69 to the left.

The end of the cylinder 70 to the left of the piston 69 is provided with a port 148 which leads from chamber 149 through pipe 150 and passage 151 to port 102 of the air compressor 12. Inasmuch as the port 102 communicates with the atmosphere through port 101, exhaust cavity 105, and port 96, as has been heretofore described, pressure in chamber 149 will be relieved and therefore the piston 69 will be free to move to the left.

As pawl 73 is engaged with the ratchet wheel 74, the movement of the piston 69 will swing arm 68 forwardly, thereby transmitting an angular movement to the ratchet wheel, and consequently to the shaft 51. The movement of arm 68 will continue until the projection 77 on the pawl 73 is brought into contact with the cam face 78 and the pawl is tripped. The pawl 75 will then prevent any reversal of the ratchet wheel 74, as has been heretofore pointed out.

When port 148 is covered by the piston 69, a pressure build up will occur, bringing the piston 69 to rest without shock, as ball check 152 will prevent any further exhaust.

From the foregoing it will be noticed that pistons 66 and 69 are arranged in parallel, an upward stroke of piston 66 causing a stroke to the left of piston 69. When the direction of the stroke of piston 66 is reversed, steam will be admitted to chamber 149, through ports 103, 102, 151, pipe 150, passage 153, past ball check 152, and through restricted passage 154, to cause a reversal of the stroke of piston 69. The movement of the piston 69 to the right will be an idle stroke, returning the parts to their original position. Thus a continuous reciprocating motion of piston 69 will be converted into an intermittent rotary motion of shaft 51.

This intermittent rotary motion of the shaft 51 causes a similar movement of the cam 52 of the pilot valve device 10, so that said cam is slowly moved into and out of engagement with the stems of the valves 53 and 54, in the direction shown by the arrow in Fig. 2. The disposition of the valves 53 and 54 is such that after these valves have been successively engaged with the cam 52, there is a protracted interval before the valves are next engaged by the cam, and since the pistons 37 and 38 of the control mechanism 9 will be balanced, the device will be in intermediate position, as shown in Fig. 2, in which communication will be so established that the air to be purified will be directed through the filtering device 7 in the manner to be hereinafter more fully described. When the device is in this intermediate position, the filtering device 6 will be dormant, and the filtering device 8 will be cleaned. When the cam 52 unseats the valve 53, the control mechanism 9 will be operated so as to cut off the supply of the air to be purified to the filtering device 7 and the air will be directed through the filtering device 6. In this sequence of the operation of the apparatus, the filtering device 8 is dormant, while the filtering device 7 is being cleaned. When the cam 52 moves away from the stem of the valve 53 and engages the stem of the valve 54, the seating of the valve 53 and the unseating of the valve 54 causes the slide valve 36 to move from the position shown in Fig. 3 to the position shown in Fig. 4, in which the filtering device 8 is now active and the filtering device 6 is being cleaned, the filtering device 7 being dormant.

Chamber 35 of the control mechanism 9 is supplied with air under pressure from the main reservoir 133, through pipe 155, and from such chamber, the air is directed to the supply port of the brake valve device 156, after such air has been filtered, through pipe 157 leading from the control mechanism 9.

When the apparatus is in the intermediate position shown in Fig. 2, the air is supplied from valve chamber 35 to the filtering device 7, through port 158 and passage and pipe 159.

Since the pipe 159 is connected to the bottom of chamber 113, the air will pass upwardly through the filtering material 114 (see arrow Fig. 2) and leave the dome of the chamber 113 through a pipe 160, connected to the seat of the slide valve 36 by a port 161.

When the purified air enters the control mechanism 9 through port 161, it is conducted to the supply port (not shown) of the brake valve device 156, by valve cavity 162, port 163, passages 164 and 165, and pipe 157.

Passage 164 is open to a passage 166 having a restricted portion or choke 167 formed therein. Therefore, a portion of the purified air from the filtering device 7 will flow to the top of the filtering device 8, through passage 166, valve cavity 168, and passage and pipe 169.

The pipes 159 and 160 associated with the filtering device 7 are connected intermediate their lengths by a pipe 170 containing a check valve 171 adapted to prevent the back flow of the purified air from the pipe 160 to the pipe 159.

The valve 127 of the steam control valve device 19 is seated by the pressure of fluid admitted to chamber 131 through passage and pipe 172, leading from the seat of the slide valve 36 in the control mechanism 9, which fluid acts on piston 130.

With the valve 127 seated, steam from the supply pipe 124 will be prevented from flowing into chamber 116, and therefore the air flowing through the filtering device 7 will not be heated.

Likewise the valve 27 of the steam control valve device 18 is seated by the pressure of fluid admitted to chamber 31 through passage and pipe 173, leading from the valve chamber 35 of the control mechanism 9, which fluid acts on piston 30.

With the valve 27 seated, steam from the supply pipe 24 will be prevented from flowing into chamber 16, and therefore no heat will be supplied to the filtering device 6.

The chamber 13 of the filtering device 6 is connected to the atmosphere through pipe and passage 174, port 175 in the slide valve 36, and atmospheric port 176.

The dome of the chamber 13 is connected to the seat of the slide valve 36 by pipe and passage 177, and pipe 177 is connected to the pipe 174 leading from the bottom of chamber 13 by a pipe 178 containing a check valve 179. This arrangement is similar to that heretofore described in connection with the filtering device 7, the check valve 179 preventing the back flow of air from the pipe 177 to the pipe 174, but permitting the establishment of a communication between said pipes should the filter become clogged for any reason.

As shown in Fig. 2, when the filtering device 7 is functioning, pipe 177 connecting the chamber 13 of the filtering device 6 with the control mechanism 9 will be lapped by the slide valve 36, and therefore no fluid under pressure is supplied to the filtering device 6, and the same is therefore dormant.

With a portion of the purified air being delivered to the filtering device 8 from the filtering device 7, through pipe 169, as has been described, the steam control valve device 20 associated with the filtering device 8 will be so positioned that steam from the supply pipe 224 can flow into the steam chamber 216. Chamber 231 will be open to atmosphere through pipe and passage 180, ports 181 and 182 in the slide valve 36, and ports 183 and 176, and the valve 227 will be unseated through pressure exerted by spring 232 against piston 230. In this way steam from the supply pipe 224 will be free to flow into the chamber 216, heating the chamber for the purpose of permitting the ready removal of the foreign matter collected by the filtering material 214, as will be understood.

Chamber 213 is connected to the atmosphere through pipe and passage 184, branch port 185 in the slide valve 36, and ports 182, 183 and 176. Thus when the air is supplied through the pipe 169 to the top of the chamber 213 of the filtering device 8, such air will flow downwardly through said chamber (see arrow Fig. 2) and carry the impurities from the filtering material 214 to the atmosphere.

The air will continue to pass through the filtering device 7, until cam 52 has been rotated in the manner heretofore described an amount sufficient to engage the end of the valve stem 57, thereby gradually unseating valve 53. This action will establish a communication through which the chamber 39 is vented to the atmosphere through port 186, pipe 187, chamber 55, opening 59, chamber 50 and vent 188.

Since the fluid pressure on the opposite sides of the piston 38 are substantially equal due to the communication provided by the equalizing port 189 in said piston, when the fluid in chamber 39 is vented to the atmosphere, in the manner just described, the pressure of the fluid acting on the opposite side of piston 37 will force said piston toward the right and the piston 38 and slide valve 36 will also be shifted to the position shown in Fig. 3. In this position port 161 will be lapped by the slide valve so that communication from the dome of chamber 113 of the filtering device 7 through which the purified air is supplied to the pipe 157 is cut off, and chamber 113 is connected to the atmosphere, through pipe and passage 159, and ports 185, 181, 183 and 176.

The air is now supplied from the valve chamber 35 to the filtering device 6, through port 158 and passage and pipe 174. Since the pipe 174 is connected to the bottom of chamber 13, the air will pass upwardly through the filtering material 14 and leave the dome of the chamber 13 through pipe 177 and flow to the supply port (not shown) of the brake valve device 156, through valve cavity 190, port 191, passages 164 and 165, and pipe 157.

Passage 164 is open to a passage 192 having a restricted portion or choke 193 formed therein. Therefore, a portion of the purified air from the filtering device 6 will flow to the top of the filtering device 7, through passage 192, valve cavity 162, port 161, and pipe 160.

The valve 27 of the steam control valve device 18 is seated by the pressure of fluid admitted to chamber 31 through passage and pipe 173, leading from the valve chamber 35, which fluid acts on piston 30.

With the valve 27 seated, steam from the supply pipe 24 will be prevented from flowing into chamber 16, and therefore the air flowing through the filtering device 6 will not be heated.

Likewise the valve 227 of the steam control valve device 20 is seated by the pressure of fluid admitted to chamber 231 through passage and pipe 180, leading from the valve chamber 35, which fluid acts on piston 230.

With the valve 227 seated, steam from the supply pipe 224 will be prevented from flowing into chamber 216, and therefore no heat will be supplied to the filtering device 8.

When the filtering device 6 is functioning, pipe 169 connecting the chamber 213 of the filtering device 8 with the control mechanism 9 will be lapped by the slide valve 36, and therefore no fluid under pressure is supplied to the filtering device 8, and the same is therefore dormant.

With a portion of the purified air being delivered to the filtering device 7 from the filtering device 6, through pipe 160, as has been described, the steam control valve device 19 associated with the filtering device 7 will be so positioned that steam from the supply pipe 124 can flow into the steam chamber 116. Chamber 131 will be open to atmosphere through pipe and passage 172, ports 194, 175 and 176, and the valve 127 will be unseated through pressure exerted by spring 132 against piston 130. In this way steam from the supply pipe 124 will be free to flow into the chamber 116, heating the chamber for the purpose of permitting the ready removal of the foreign matter collected by the filtering material in chamber 113.

Chamber 113 is connected to the atmosphere through pipe and passage 159, and ports 185, 181, 183 and 176. Thus when the air is supplied through the pipe 160 to the top of the chamber 113 of the filtering device 7, such air will flow downwardly through said chamber and carry the impurities therein to the atmosphere.

The air will continue to pass through the filtering device 6 until cam 52 has been rotated in the manner heretofore described an amount sufficient to permit spring 33 to force valve 53 to its seat, thereby closing the vent from chamber 55.

When valve 53 is seated, the cam 52 will have been rotated an amount sufficient to engage the end of the valve stem 58, thereby gradually unseating valve 54. This action will establish a communication through which the chamber 40 is vented to the atmosphere through port 195, pipe 196, chamber 56, opening 60, chamber 50 and vent 188.

Since the fluid pressure on the opposite sides of the piston 37 will now be substantially equal, due to the seating of valve 53 and the communication provided by the equalizing port 197 in said piston, when the fluid in chamber 40 is vented to the atmosphere, in the manner just described, the pressure of the fluid acting on the opposite sides of piston 38 will force said piston toward the left and the piston 37 and slide valve 36 will also be shifted to the left, as shown in Fig. 4. In this position the communication through which air is supplied from the valve chamber 35, through pipe 174 to the chamber 13 of the filtering device 6 is cut off and the pipe 174 is connected to the atmosphere vent port 176 by port 175.

The air is now supplied from the valve chamber 35 to the filtering device 8, through port 158, and passage and pipe 184. Since pipe 184 is connected to the bottom of chamber 213, the air will pass upwardly through the filtering material 214 and leave the dome of the chamber 213 through pipe 169 and flow to the brake valve device 156, through valve cavity 168, passages 164 and 165 and pipe 157.

Passage 164 is open to a passage 198 having a restricted portion or choke 199 formed therein. Therefore, a portion of the purified air from the filtering device 8 will flow to the top of the filtering device 6, through passage 198, valve cavity 190, and passage and pipe 177.

The valve 227 of the steam control valve device 20 is seated by the pressure of fluid admitted to chamber 231 through passage and pipe 180 and port 200 in the slide valve 36, leading from the valve chamber 35, which fluid acts on piston 230.

With the valve 227 seated, steam from the supply pipe 224 will be prevented from flowing into chamber 216, and therefore the air flowing through the filtering device 8 will not be heated.

Likewise the valve 127 of the steam control valve device 19 is seated by the pressure of fluid admitted to chamber 131 through passage and pipe 172, leading from the valve chamber 35, which fluid acts on piston 130.

With the valve 127 seated, steam from the supply pipe 124 will be prevented from flowing into chamber 116, and therefore no heat will be supplied to the filtering device 7.

When the filtering device 8 is functioning, pipe 160 connecting the chamber 113 of the filtering device 7 with the valve chamber 35 will be lapped by the slide valve 36 (see Fig. 4), and therefore no fluid under pressure is supplied to the filtering device 7, and the same is therefore dormant.

With a portion of the purified air being delivered to the filtering device 6 from the filtering device 8, through pipe 177, as has been described, the steam control valve device 18 associated with the filtering device 6 will be so positioned that steam from the supply pipe 24 can flow into the steam chamber 16. Chamber 31 will be open to atmosphere through pipe and passage 173, ports 181, 183 and 176, and the valve 27 will be unseated through the pressure exerted by spring 32 against piston 30. In this way steam from the supply pipe 24 will be free to flow into the chamber 16, heating the chamber for the purpose of permitting the ready removal of the foreign matter collected by the filtering material in chamber 13.

Chamber 13 is connected to the atmosphere through pipe and passage 174, and ports 175 and 176. Thus when the air is supplied through the pipe 177 to the top of the chamber 13 of the filtering device 6, such air will flow downwardly through said chamber and carry the impurities therein to the atmosphere.

The air will continue to pass through the filtering device 8 until the cam 52 moves past the stem of the valve 54. The spring 34 then forces valve 54 to its seat, thereby closing the vent from chamber 56. This action will permit the pressures to equalize on the opposite sides of piston 38 through the communication provided by the equalizing port 189, and the parts of the control mechanism 9 will return to the intermediate position shown in Fig. 2, in which the filtering device 7 again functions.

In this manner the air from the main reservoir of an air brake system is effectively cleansed of all oil and water vapors by passing the same successively through the filtering devices 6, 7 and 8. The invention also includes the novel arrangement of the several parts of the apparatus so that while one filtering device is functioning as a filter and another filtering device is heated and cleaned, the third filtering device will be dormant, thereby permitting the same to cool before being again placed into operation.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a fluid purifying system, the combination with a plurality of filtering devices, of means for periodically employing one of said devices to filter fluid, means for periodically cleaning said device by fluid purified by another of said devices, and means for periodically retaining the cleaned device inoperative after the same has been cleaned, said means operating in timed relation and in a predetermined cyclic order.

2. In a fluid purifying system, the combination with a plurality of filtering devices, of means for periodically employing one of said devices to filter fluid, means for periodically cleaning said device by fluid purified by another of said devices, means for heating said device while the same is being cleaned, and means for maintaining said devices inoperative, said means operating automatically in predetermined timed relation and in a predetermined cyclic order.

3. In a fluid purifying system the combination with a plurality of filtering devices, of automatic means for periodically employing one of said devices to filter fluid, means for periodically cleaning said device by fluid purified by another of said devices, means for heating said device, while the same is being cleaned, and means for maintaining said devices inoperative for time intervals of predetermined duration after the same have been cleaned.

4. In a fluid purifying system, the combination with a plurality of filtering devices, of automatic means for successively employing said devices to filter fluid for predetermined periods, means for periodically cleaning said devices with purified fluid, means for heating said devices while the same are being cleaned, and means for maintaining said devices inoperative for time intervals of predetermined duration after the same have been cleaned to permit said devices to cool.

5. An air purifying apparatus having a reservoir, means for supplying air under pressure to the reservoir, three filters, means actuated by said pressure means for successively directing air from the reservoir to each of the filters for predetermined periods, means for successively supplying air purified by flow through one filter to another filter for cleaning said other filter, and means for maintaining said filters inoperative for predetermined periods after the same have been cleaned.

6. An air purifying apparatus having a reservoir, means for supplying air under pressure to the reservoir, a plurality of filters, means actuated by said pressure means for successively directing air from the reservoir to each of the filters for predetermined periods, means for successively supplying air purified by flow through one filter to another filter for cleaning the other filter, and means for causing said filters to be inoperative for a predetermined period after each have been cleaned.

7. An air purifying apparatus having a reservoir, means for supplying air under pressure to the reservoir, a plurality of filters, means for successively directing air from the reservoir to each of the filters for predetermined periods, means for supplying air purified by flow through one filter to another filter for cleaning the other filter immediately after each filtering period, means for heating the filters while the same are being cleaned, and means for maintaining said filters inoperative for time intervals of predetermined duration after the same have been cleaned to permit said filters to cool.

8. An air purifying apparatus having a reservoir, means for supplying air under pressure to the reservoir, a plurality of filters, means for directing air from the reservoir successively to each of the filters whereby each filter operates to filter the air for a predetermined period, means for supplying air purified by flow through one filter to another filter for a predetermined period following the period in which the filter operates so that the filter is cleaned, means for heating the filters while the same are being cleaned, and means for maintaining the filters inoperative for a predetermined period after the same are cleaned whereby said filters cool before being again operated.

9. In a fluid purifying system, the combination with three filters, of means for operating the filters automatically in a predetermined timed relation and in predetermined cyclic order whereby the filters are each successively operated for predetermined periods for filtering the fluid, then cleaned for similar periods by purified fluid to remove the impurities collected therein during the filtering periods, and then rendered inoperative for similar periods to permit the same to cool.

In testimony whereof I have hereunto set my hand.

MABLE M. THOMAS,
*Executrix of the Last Will and Testament of Thomas H. Thomas, Deceased.*